(12) United States Patent
Guo et al.

(10) Patent No.: US 7,250,477 B2
(45) Date of Patent: Jul. 31, 2007

(54) THERMOSET COMPOSITE COMPOSITION, METHOD, AND ARTICLE

(75) Inventors: Hua Guo, Selkirk, NY (US); Zhiqing Lin, Latham, NY (US); Gary William Yeager, Rexford, NY (US)

(73) Assignee: General Electric Company, Schenectady, NY (US)

( * ) Notice: Subject to any disclaimer, the term of this patent is extended or adjusted under 35 U.S.C. 154(b) by 452 days.

(21) Appl. No.: 10/733,062

(22) Filed: Dec. 11, 2003

(65) Prior Publication Data

US 2004/0122153 A1 Jun. 24, 2004

Related U.S. Application Data

(60) Provisional application No. 60/319,872, filed on Jan. 16, 2003, provisional application No. 60/319,805, filed on Dec. 20, 2002.

(51) Int. Cl.
*C08K 3/34* (2006.01)
*C08F 283/08* (2006.01)

(52) U.S. Cl. .................. 525/391; 524/445; 524/447

(58) Field of Classification Search ........... 524/430, 524/445, 447, 494; 525/391
See application file for complete search history.

(56) References Cited

U.S. PATENT DOCUMENTS

| | | | |
|---|---|---|---|
| 3,375,228 A | 3/1968 | Holoch et al. | |
| 4,148,843 A | 4/1979 | Goossens | |
| 4,528,235 A | 7/1985 | Sacks et al. | |
| 4,562,243 A | 12/1985 | Percec | |
| 4,618,528 A | 10/1986 | Sacks et al. | |
| 4,634,742 A | 1/1987 | Percec | |
| 4,663,402 A | 5/1987 | Percec et al. | |
| 4,665,137 A | 5/1987 | Percec | |
| 4,677,185 A | 6/1987 | Heitz et al. | |
| 4,701,514 A | 10/1987 | Percec | |
| 4,739,007 A | 4/1988 | Okada et al. | |
| 4,760,118 A | 7/1988 | White et al. | |
| H000521 H | 9/1988 | Fan | |
| 4,806,601 A | 2/1989 | Percec | |
| 4,810,734 A | 3/1989 | Kawasumi et al. | |
| 4,874,728 A | 10/1989 | Eilliott et al. | |
| 4,889,885 A | 12/1989 | Usuki et al. | |
| 4,923,932 A | 5/1990 | Katayose et al. | |
| 5,071,922 A | 12/1991 | Nelissen et al. | |
| 5,079,268 A | 1/1992 | Nelissen et al. | |
| 5,091,480 A | 2/1992 | Percec | |
| 5,171,761 A | 12/1992 | Penco et al. | |
| 5,218,030 A | 6/1993 | Katayose et al. | |
| 5,219,951 A | 6/1993 | Nelissen et al. | |
| 5,304,600 A | 4/1994 | Nelissen et al. | |
| 5,310,820 A | 5/1994 | Nelissen et al. | |
| 5,338,796 A | 8/1994 | Vianello et al. | |
| 5,385,776 A | 1/1995 | Maxfield | |
| 5,407,972 A | 4/1995 | Smith et al. | |
| 5,552,469 A | 9/1996 | Beall et al. | |
| 5,578,672 A | 11/1996 | Beall et al. | |
| 5,698,624 A | 12/1997 | Beall et al. | |
| 5,760,121 A | 6/1998 | Beall et al. | |
| 5,834,565 A | 11/1998 | Tracy et al. | |
| 5,877,248 A | 3/1999 | Beall et al. | |
| 5,965,663 A | 10/1999 | Hayase | |
| 6,051,662 A | 4/2000 | Tracy et al. | |
| 6,228,903 B1 | 5/2001 | Beall et al. | |
| 6,251,308 B1 | 6/2001 | Butler | |
| 6,287,992 B1 | 9/2001 | Polansky et al. | |
| 6,306,963 B1 | 10/2001 | Lane et al. | |
| 6,352,782 B2 | 3/2002 | Yeager et al. | |
| 6,384,176 B1 | 5/2002 | Braat et al. | |
| 6,469,124 B2 | 10/2002 | Braat et al. | |
| 6,521,690 B1 * | 2/2003 | Ross et al. | ........... 524/445 |
| 6,521,703 B2 | 2/2003 | Zarnoch et al. | |
| 6,562,891 B1 * | 5/2003 | Tsai et al. | ........... 524/445 |
| 6,593,391 B2 | 7/2003 | Teutsch et al. | |
| 6,617,398 B2 | 9/2003 | Yeager et al. | |
| 6,627,704 B2 | 9/2003 | Yeager et al. | |
| 6,627,708 B2 | 9/2003 | Braat et al. | |
| 6,645,569 B2 | 11/2003 | Cramer et al. | |
| 6,646,302 B2 | 11/2003 | Kan et al. | |
| 6,652,967 B2 | 11/2003 | Yadav et al. | |
| 6,794,481 B2 | 9/2004 | Amagai et al. | |
| 6,812,276 B2 * | 11/2004 | Yeager | ........... 524/495 |
| 6,878,781 B2 * | 4/2005 | Zarnoch et al. | ........... 525/391 |
| 6,878,782 B2 * | 4/2005 | Merfeld et al. | ........... 525/391 |
| 6,905,637 B2 * | 6/2005 | Yeager et al. | ........... 252/511 |
| 7,022,777 B2 | 4/2006 | Davis et al. | |
| 2001/0053820 A1 | 12/2001 | Yeager et al. | |
| 2002/0120047 A1 | 8/2002 | Border et al. | |
| 2002/0120048 A1 | 8/2002 | Border et al. | |
| 2002/0169256 A1 | 11/2002 | Merfeld et al. | |
| 2002/0173597 A1 | 11/2002 | Zarnoch et al. | |
| 2002/0177027 A1 | 11/2002 | Yeager et al. | |
| 2003/0096123 A1 | 5/2003 | Yeager | |
| 2003/0215588 A1 | 11/2003 | Yeager et al. | |
| 2004/0146692 A1 | 7/2004 | Inoue et al. | |
| 2005/0075462 A1 | 4/2005 | Zarnoch et al. | |

FOREIGN PATENT DOCUMENTS

DE    31 17 514 A1    5/1981

(Continued)

OTHER PUBLICATIONS

Ciullo, Peter. Industrial Minerals and Their Uses. Noyes Publications, 1996, pp. 221-222.*

(Continued)

*Primary Examiner*—Peter Szekely
(74) *Attorney, Agent, or Firm*—Cantor Colburn LLP

(57) ABSTRACT

A curable composition includes a functionalized poly (arylene ether), an olefinically unsaturated monomer, and a nanofiller. Suitable nanofillers include, for example, carbon nanofibers and nanotubes, main group metal oxides, transition metal oxides, metal carbides, cermet materials, ceramics, glass, perovskites, layered inorganic materials, fibrillar inorganic materials, and combinations thereof. The nanofiller may, optionally, be rendered more organophilic by intercalation with neutral or ionic molecules. Methods of preparing and curing the composition, as well as uses for the cured composition, are described.

32 Claims, No Drawings

FOREIGN PATENT DOCUMENTS

| | | |
|---|---|---|
| DE | 41 03 140 A1 | 2/1991 |
| EP | 0 261 574 | 11/1991 |
| EP | 732371 A2 * | 9/1996 |
| WO | WO 93/04117 | 3/1993 |
| WO | WO 93/11190 | 10/1993 |
| WO | WO 95/14733 | 1/1995 |
| WO | WO 200140354 A1 * | 6/2001 |
| WO | WO 02/079301 A2 | 10/2002 |

OTHER PUBLICATIONS

International Search Report for PCT/US 03/39894 mailed Dec. 8, 2004.

Den, Jianjun et al., "Polyhedral Oligomeric Silsesquioxane Amphiphiles: Isotherm and Brewster Angle Microscopy Studies of Trisilanolisobutyl-POSS at the Air/Water Interface" Langmuir (2004), 20(10), 109-115.

Pugh et al. "Group Transfer Polymerization of Some Unusual Acrylates and Methacrylates", Polym. Prepr. (Am. Chem. Soc., Div. Polym. Chem.) (1985), 26 (2), 303-5.

S. J. Monte et al., "A New Generation of Age and Water Resistant Reinforced Plastics", ANTEC, 1979, Section 16-E, pp. 1-10.

L. B. Cohen, "Zircoaluminates Strengthen Premium Ranges of Chemical Coupling Agents", Plastics Engineering, vol. 39, No. 11, pp. 29-32 (1983).

S. J. Monte et al., "Coupling Composites with Titanate During Extrusion Processing", Modern Plastics, May 1984, pp. 74-78.

"Plastic Additives Handbook, 4th Edition" R. Gachter and H. Muller (eds.), P. P. Klemchuck (assoc. ed) Hansen Publishers, New York 1993, pp. 914-935.

Chem. Mater. 1996, 8, 1584-1587, Shi et al., "Interfacial Effects on the Reinforcement Properties of Polymer-Organoclay Nanocomposites".

Chem. Mater. 1994, 6, 468-474, Wang et al., "Clay-Polymer Nanocomposites Formed from Acidic Derivatives of Montmorillonite and an Epoxy Resin".

Chem. Mater. 1994, 6, 1719-1725, Messersmith et al., "Synthesis and Characterization of Layered Silicate-Epoxy Nanocomposites".

Chem. Mater. 1995, 7, 2144-2150, Lan et al., "Mechanism of Clay Tactoid Exfoliation in Epoxy-Clay Nanocomposites".

Reichle et al., "Catalytic Reactions by Thermally Activated, Synthetic, Anionic Clay Materials", Journal of Catalysis 94, 547-557 (1985).

"Interfacial Properties of POSS-Nanofillers," J. Polidan et al., American Physical Society Mar. 2002 Meeting, Session M33, Poster Session IV (http://eps.org/aps/meet/MAR02/baps/abs/S4735035.html).

Callaghan et al., "Interaction Energies for Blends of Poly(methyl methacrylate), Polystyrene, and Poly (α-methylstyrene) by the Critical Molecular Weight Method", Macromolecules 1993, 26, 2439-2450.

Isaac C. Sanchez, "Relationships Between Polymer Interaction Parameters", Polymer, 1989, vol. 30, March, 471-475.

* cited by examiner

THERMOSET COMPOSITE COMPOSITION, METHOD, AND ARTICLE

CROSS REFERENCE TO RELATED APPLICATIONS

This application claims the benefit of U.S. Provisional Application Ser. No. 60/319,805, filed Dec. 20, 2002, and U.S. Provisional Application Ser. No. 60/319,872, filed Jan. 16, 2003.

BACKGROUND OF INVENTION

Thermoset molding compositions known in the art are generally thermosetting resins containing inorganic fillers and/or fibers. Upon heating, thermoset monomers initially exhibit viscosities low enough to allow for melt processing and molding of an article from the filled monomer composition. Upon further heating, the thermosetting monomers react and cure to form hard resins with high stiffness.

One potential industrial use of thermoset compositions is electrical applications and under hood components such as engine valve covers. Electrical applications typically require specific dielectric properties that are dependent upon the application. Under hood components preferably exhibit high strength, high ductility and high modulus at elevated temperatures. It is also preferred that the dimensions of the molded parts conform closely to those of the molds used to prepare them.

U.S. Pat. No. 6,352,782 to Yeager et al. describes thermoset compositions comprising poly(arylene ether) resins that have been capped with ethylenically unsaturated groups. These compositions exhibit desirable properties including high glass transition temperatures and low coefficients of thermal expansion. However, these materials are not suitable for all applications.

There remains a need for thermoset compositions that can provide excellent mechanical properties and application specific properties such as dielectric strength and high modulus.

SUMMARY OF INVENTION

The above-described and other drawbacks are alleviated by a curable composition, comprising a functionalized poly(arylene ether), an olefinically unsaturated monomer, and a nanofiller.

Other embodiments, including a method of preparing a curable composition, a cured composition comprising the reaction product of the curable composition, and articles comprising the cured composition, are described below.

DETAILED DESCRIPTION

One embodiment is a curable composition, comprising a functionalized poly(arylene ether), an olefinically unsaturated monomer, and a nanofiller. The curable composition may further comprise a polymeric additive.

Nanofiller is defined herein as a particulate filler material wherein the nanoparticles have no linear dimension greater than about 1000 nanometers, preferably no linear dimension greater than about 500 nanometers, more preferably no linear dimension greater than about 100 nanometers, still more preferably no linear dimension greater than 10 nanometers, even more preferably no linear dimension greater than 1 nanometer. Use of nanofillers in the curable composition allows heretofore unknown manipulation of properties in the curable composition and, after curing, of the cured composition. Use of nanofiller may result in compositions with improved mechanical properties such as a combination of high ductility and high modulus or in compositions with tailored dielectrical strength.

The composition comprises a functionalized poly(arylene ether), which may be a capped poly(arylene ether) or a ring-functionalized poly(arylene ether), each of which is defined below.

The functionalized poly(arylene ether) may be a capped poly(arylene ether). A capped poly(arylene ether) is defined herein as a poly(arylene ether) in which at least 50%, preferably at least 75%, more preferably at least 90%, yet more preferably at least 95%, even more preferably at least 99%, of the free hydroxyl groups present in the corresponding uncapped poly(arylene ether) have been functionalized by reaction with a capping agent.

The capped poly(arylene ether) may be represented by the structure $$Q(J\text{-}K)_y$$ 

wherein Q is the residuum of a monohydric, dihydric, or polyhydric phenol, preferably the residuum of a monohydric or dihydric phenol, more preferably the residuum of a monohydric phenol; y is 1 to 100; J comprises repeating structural units having the formula

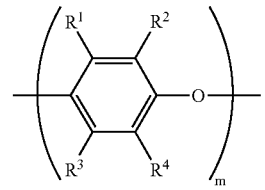

wherein m is 1 to about 200, preferably 2 to about 200; $R^2$ and $R^4$ are each independently halogen, primary or secondary $C_1$-$C_{12}$ alkyl, $C_2$-$C_{12}$ alkenyl, $C_2$-$C_{12}$ alkynyl, $C_1$-$C_{12}$ aminoalkyl, $C_1$-$C_{12}$ hydroxyalkyl, phenyl, $C_1$-$C_{12}$ haloalkyl, $C_1$-$C_{12}$ hydrocarbonoxy, $C_2$-$C_{12}$ halohydrocarbonoxy wherein at least two carbon atoms separate the halogen and oxygen atoms, or the like; $R^1$ and $R^3$ are each independently hydrogen, halogen, primary or secondary $C_1$-$C_{12}$ alkyl, $C_2$-$C_{12}$ alkenyl, $C_2$-$C_{12}$ alkynyl, $C_1$-$C_{12}$ aminoalkyl, $C_1$-$C_{12}$ hydroxyalkyl, phenyl, $C_1$-$C_{12}$ haloalkyl, $C_1$-$C_{12}$ hydrocarbonoxy, $C_2$-$C_{12}$ halohydrocarbonoxy wherein at least two carbon atoms separate the halogen and oxygen atoms, or the like; and K is a capping group produced by reaction of a phenolic hydroxyl group on the poly(arylene ether) with a capping reagent. The resulting capping group may be

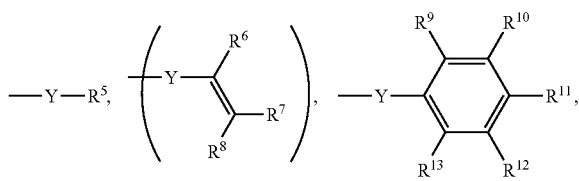

or the like, wherein $R^5$ is $C_1$-$C_{12}$ alkyl, or the like; $R^6$-$R^8$ are each independently hydrogen, $C_1$-$C_{12}$ alkyl, $C_2$-$C_{12}$ alkenyl, $C_6$-$C_{18}$ aryl, $C_7$-$C_{18}$ alkyl-substituted aryl, $C_7$-$C_{18}$ aryl-substituted alkyl, $C_2$-$C_{12}$ alkoxycarbonyl, $C_7$-$C_{18}$ aryloxycarbonyl, $C_7$-$C_{18}$ alkyl-substituted aryloxycarbonyl, $C_7$-$C_{18}$ aryl-substituted alkoxycarbonyl, nitrile, formyl, carboxylate, imidate, thiocarboxylate, or the like; $R^9$-$R^{13}$ are each independently hydrogen, halogen, $C_1$-$C_{12}$ alkyl, hydroxy, amino, or the like; and wherein Y is a divalent group such as

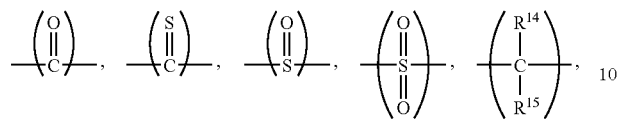

or the like, wherein $R^{14}$ and $R^{15}$ are each independently hydrogen, $C_1$-$C_{12}$ alkyl, or the like.

In one embodiment, Q is the residuum of a phenol, including polyfunctional phenols, and includes radicals of the structure

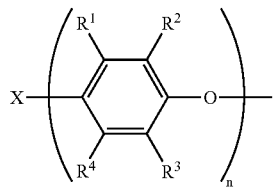

wherein $R^1$-$R^4$ are each independently hydrogen, halogen, primary or secondary $C_1$-$C_{12}$ alkyl, $C_1$-$C_{12}$ alkenyl, $C_1$-$C_{12}$ alkynyl, $C_1$-$C_{12}$ aminoalkyl, $C_1$-$C_{12}$ hydroxyalkyl, phenyl, $C_1$-$C_{12}$ haloalkyl, $C_1$-$C_{12}$ aminoalkyl, $C_1$-$C_{12}$ hydrocarbonoxy, $C_1$-$C_{12}$ halohydrocarbonoxy wherein at least two carbon atoms separate the halogen and oxygen atoms, or the like; X may be hydrogen, $C_1$-$C_{12}$ alkyl, $C_6$-$C_{18}$ aryl, $C_7$-$C_{18}$ alkyl-substituted aryl, $C_7$-$C_{18}$ aryl-substituted alkyl, or any of the foregoing hydrocarbon groups containing at least one substituent such as carboxylic acid, aldehyde, alcohol, amino radicals, or the like; X also may be sulfur, sulfonyl, sulfuryl, oxygen, or other such bridging group having a valence of 2 or greater to result in various bis- or higher polyphenols; y and n are each independently 1 to about 100, preferably 1 to 3, and more preferably about 1 to 2; in a preferred embodiment, y=n. Q may also be the residuum of a diphenol, such as 2,2',6,6'-tetramethyl-4,4'-diphenol.

In one embodiment, the capped poly(arylene ether) is produced by capping a poly(arylene ether) consisting essentially of the polymerization product of at least one monohydric phenol having the structure

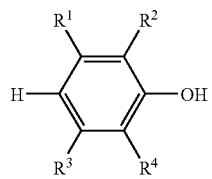

wherein $R^1$-$R^4$ are each independently hydrogen, halogen, primary or secondary $C_1$-$C_{12}$ alkyl, $C_2$-$C_{12}$ alkenyl, $C_2$-$C_{12}$ alkynyl, $C_1$-$C_{12}$ aminoalkyl, $C_1$-$C_{12}$ hydroxyalkyl, phenyl, $C_1$-$C_{12}$ haloalkyl, $C_1$-$C_{12}$ hydrocarbonoxy, $C_2$-$C_{12}$ halohydrocarbonoxy wherein at least two carbon atoms separate the halogen and oxygen atoms, or the like. Suitable monohydric phenols include those described in U.S. Pat. No. 3,306,875 to Hay, and highly preferred monohydric phenols include 2,6-dimethylphenol and 2,3,6-trimethylphenol. The poly(arylene ether) may be a copolymer of at least two monohydric phenols, such as 2,6-dimethylphenol and 2,3,6-trimethylphenol.

In a preferred embodiment, the capped poly(arylene ether) comprises at least one capping group having the structure

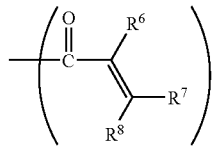

wherein $R^6$-$R^8$ are each independently hydrogen, $C_1$-$C_{12}$ alkyl, $C_2$-$C_{12}$ alkenyl, $C_6$-$C_{18}$ aryl, $C_7$-$C_{18}$ alkyl-substituted aryl, $C_7$-$C_{18}$ aryl-substituted alkyl, $C_2$-$C_{12}$ alkoxycarbonyl, $C_7$-$C_{18}$ aryloxycarbonyl, $C_7$-$C_{18}$ alkyl-substituted aryloxycarbonyl, $C_7$-$C_{18}$ aryl-substituted alkoxycarbonyl, nitrile, formyl, carboxylate, imidate, thiocarboxylate, or the like. Highly preferred capping groups include acrylate ($R^6$=$R^7$=$R^8$=hydrogen) and methacrylate ($R^6$=methyl, $R^7$=$R^8$=hydrogen).

In another preferred embodiment, the capped poly (arylene ether) comprises at least one capping group having the structure

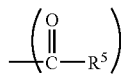

wherein $R^5$ is $C_1$-$C_{12}$ alkyl, preferably $C_1$-$C_6$ alkyl, more preferably methyl, ethyl, or isopropyl.

The present inventors have surprisingly found that the advantageous properties can be achieved even when the capped poly(arylene ether) lacks a polymerizable function such as a carbon-carbon double bond.

In yet another preferred embodiment, the capped poly (arylene ether) comprises at least one capping group having the structure

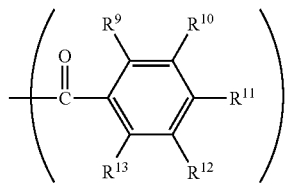

wherein $R^9$-$R^{13}$ are each independently hydrogen, halogen, $C_1$-$C_{12}$ alkyl, hydroxy, amino, or the like. Preferred capping groups of this type include salicylate ($R^9$=hydroxy, $R^{10}$-$R^3$=hydrogen).

In still another preferred embodiment, the capped poly (arylene ether) comprises at least one capping group having the structure

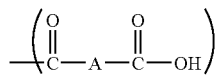

wherein A is a saturated or unsaturated $C_2$-$C_{12}$ divalent hydrocarbon group such as, for example, ethylene, 1,2-propylene, 1,3-propylene, 2-methyl-1,3-propylene, 2,2-dimethyl-1,3-propylene, 1,2-butylene, 1,3-butylene, 1,4-butylene, 2-methyl-1,4-butylene, 2,2-dimethyl-1,4-butylene, 2,3-dimethyl-1,4-butylene, vinylene (—CH═CH—), 1,2-phenylene, and the like. These capped poly(arylene ether) resins may conveniently be prepared, for example, by reaction of an uncapped poly(arylene ether) with a cyclic anhydride capping agent. Such cyclic anhydride capping agents include, for example, maleic anhydride, succinic anhydride, glutaric anhydride, adipic anhydride, phthalic anhydride, and the like.

There is no particular limitation on the method by which the capped poly(arylene ether) is prepared. The capped poly(arylene ether) may be formed by the reaction of an uncapped poly(arylene ether) with a capping agent. Capping agents include compounds known in the literature to react with phenolic groups. Such compounds include both monomers and polymers containing, for example, anhydride, acid chloride, epoxy, carbonate, ester, isocyanate, cyanate ester, or alkyl halide radicals. Capping agents are not limited to organic compounds as, for example, phosphorus and sulfur based capping agents also are included. Examples of capping agents include, for example, acetic anhydride, succinic anhydride, maleic anhydride, salicylic anhydride, polyesters comprising salicylate units, homopolyesters of salicylic acid, acrylic anhydride, methacrylic anhydride, glycidyl acrylate, glycidyl methacrylate, acetyl chloride, benzoyl chloride, diphenyl carbonates such as di(4-nitrophenyl)carbonate, acryloyl esters, methacryloyl esters, acetyl esters, phenylisocyanate, 3-isopropenyl-alpha,alpha-dimethylphenylisocyanate, cyanatobenzene, 2,2-bis(4-cyanatophenyl) propane, 3-(alpha-chloromethyl)styrene, 4-(alpha-chloromethyl)styrene, allyl bromide, and the like, carbonate and substituted derivatives thereof, and mixtures thereof. These and other methods of forming capped poly(arylene ether)s are described, for example, in U.S. Pat. No. 3,375,228 to Holoch et al.; U.S. Pat. No. 4,148,843 to Goossens; U.S. Pat. Nos. 4,562,243, 4,663,402, 4,665,137, and 5,091,480 to Percec et al.; U.S. Pat. Nos. 5,071,922, 5,079,268, 5,304,600, and 5,310,820 to Nelissen et al.; U.S. Pat. No. 5,338,796 to Vianello et al.; and European Patent No. 261,574 B1 to Peters et al.

In a preferred embodiment, the capped poly(arylene ether) may be prepared by reaction of an uncapped poly (arylene ether) with an anhydride in an alkenyl aromatic monomer as solvent. This approach has the advantage of generating the capped poly(arylene ether) in a form that can be immediately blended with other components to form a curable composition; using this method, no isolation of the capped poly(arylene ether) or removal of unwanted solvents or reagents is required.

A capping catalyst may be employed in the reaction of an uncapped poly(arylene ether) with an anhydride. Examples of such compounds include those known to the art that are capable of catalyzing condensation of phenols with the capping agents described above. Useful materials are basic compounds including, for example, basic compound hydroxide salts such as sodium hydroxide, potassium hydroxide, tetraalkylammonium hydroxides, and the like; tertiary alkylamines such as tributyl amine, triethylamine, dimethylbenzylamine, dimethylbutylamine and the like; tertiary mixed alkyl-arylamines and substituted derivatives thereof such as N,N-dimethylaniline; heterocyclic amines such as imidazoles, pyridines, and substituted derivatives thereof such as 2-methylimidazole, 2-vinylimidazole, 4-(dimethylamino)pyridine, 4-(1-pyrrolino)pyridine, 4-(1-piperidino)pyridine, 2-vinylpyridine, 3-vinylpyridine, 4-vinylpyridine, and the like. Also useful are organometallic salts such as, for example, tin and zinc salts known to catalyze the condensation of, for example, isocyanates or cyanate esters with phenols. The organometallic salts useful in this regard are known to the art in numerous publications and patents well known to those skilled in this art.

The functionalized poly(arylene ether) may be a ring-functionalized poly(arylene ether). A ring-functionalized poly(arylene ether) is defined herein as a poly(arylene ether) comprising repeating structural units of the formula

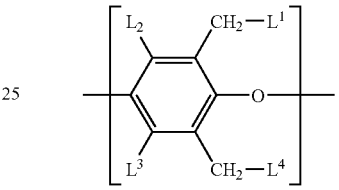

wherein each $L^1$-$L^4$ is independently hydrogen, an alkenyl group, or an alkynyl group; wherein the alkenyl group is represented by

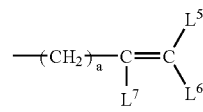

wherein $L^5$-$L^7$ are independently hydrogen or methyl, and a is an integer from 1 to 4; wherein the alkynyl group is represented by

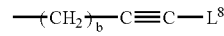

wherein $L^8$ is hydrogen, methyl, or ethyl, and b is an integer from 1 to 4; and wherein about 0.02 mole percent to about 25 mole percent of the total $L^1$-$L^4$ substituents in the ring-functionalized poly(arylene ether) are alkenyl and/or alkynyl groups. Within this range, it may be preferred to have at least about 0.1 mole percent, more preferably at least about 0.5 mole percent, alkenyl and/or alkynyl groups. Also within this range, it may be preferred to have up to about 15 mole percent, more preferably up to about 10 mole percent, alkenyl and/or alkynyl groups.

The ring-functionalized poly(arylene ether) may be prepared according to known methods. For example, an unfunctionalized poly(arylene ether) such as poly(2,6-dimethyl-1,4-phenylene ether) may be metalized with a reagent such as n-butyl lithium and subsequently reacted with an alkenyl halide such as allyl bromide and/or an alkynyl halide such as propargyl bromide. This and other methods for preparation of ring-functionalized poly(arylene ether) resins are described, for example, in U.S. Pat. No. 4,923,932 to Katayose et al.

It will be understood that the poly(arylene ether)s described herein as "uncapped" or "unfunctionalized" comprise repeating structural units having the formula

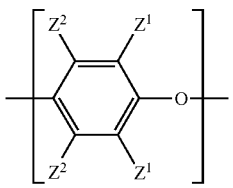

wherein for each structural unit, each $Z^1$ is independently hydrogen, halogen, primary or secondary $C_1$-$C_{12}$ alkyl, $C_1$-$C_{12}$ aminoalkyl, $C_1$-$C_{12}$ hydroxyalkyl, phenyl, $C_1$-$C_{12}$ haloalkyl, $C_1$-$C_{12}$ hydrocarbonoxy, $C_1$-$C_{12}$ halohydrocarbonoxy wherein at least two carbon atoms separate the halogen and oxygen atoms, or the like; and each $Z^2$ is independently halogen, primary or secondary $C_1$-$C_{12}$ alkyl, $C_1$-$C_{12}$ aminoalkyl, $C_1$-$C_{12}$ hydroxyalkyl, phenyl, $C_1$-$C_{12}$ haloalkyl, $C_1$-$C_{12}$ hydrocarbonoxy, $C_1$-$C_{12}$ halohydrocarbonoxy wherein at least two carbon atoms separate the halogen and oxygen atoms, or the like. Preferably, each $Z^1$ is $C_{1-4}$ alkyl, and each $Z^2$ is hydrogen or methyl.

There is no particular limitation on the molecular weight or intrinsic viscosity of the functionalized poly(arylene ether). In one embodiment, the composition may comprise a functionalized poly(arylene ether) having a number average molecular weight up to about 10,000 atomic mass units (AMU), preferably up to about 5,000 AMU, more preferably up to about 3,000 AMU. Such a functionalized poly(arylene ether) may be useful in preparing and processing the composition by reducing its viscosity.

In another embodiment, the composition may comprise a functionalized poly(arylene ether) having an intrinsic viscosity of about 0.08 to about 0.30 deciliters per gram (dL/g), preferably about 0.12 to about 0.30 dL/g, more preferably about 0.15 to about 0.25 dL/g as measured in chloroform at 25° C. Generally, the intrinsic viscosity of a functionalized poly(arylene ether) will vary insignificantly from the intrinsic viscosity of the corresponding unfunctionalized poly(arylene ether). Specifically, the intrinsic viscosity of a functionalized poly(arylene ether) will generally be within 10% of that of the unfunctionalized poly(arylene ether). These intrinsic viscosities may correspond approximately to number average molecular weights of about 5,000 to about 25,000 AMU. Within this range, a number average molecular weight of at least about 8,000 AMU may be preferred, and a number average molecular weight of at least about 10,000 AMU may be more preferred. Also within this range, a number average molecular weight up to about 20,000 AMU may be preferred. Such a functionalized poly(arylene ether) may provide the composition with a desirable balance of toughness and processability. It is expressly contemplated to employ blends of at least two functionalized poly(arylene ether)s having different molecular weights and intrinsic viscosities.

In a preferred embodiment, the functionalized poly(arylene ether) is substantially free of amino substituents, including alkylamino and dialkylamino substituents, wherein substantially free means that the functionalized poly(arylene ether) contains less than about 300 micrograms, preferably less than about 100 micrograms, of atomic nitrogen per gram of functionalized poly(arylene ether). Although many poly(arylene ether)s are synthesized by processes that result in the incorporation of amino substituents, the present inventors have found that thermoset curing rates are increased when the functionalized poly(arylene ether) is substantially free of amino substituents. Poly(arylene ether)s substantially free of amino substituents may be synthesized directly or generated by heating amino-substituted poly(arylene ether)s to at least about 200° C. Alternatively, if the functionalized poly(arylene ether) contains amino substituents, it may be desirable to cure the composition at a temperature less than about 200° C.

The composition may comprise a blend of at least two functionalized poly(arylene ethers). Such blends may be prepared from individually prepared and isolated functionalized poly(arylene ethers). Alternatively, such blends may be prepared by reacting a single poly(arylene ether) with at least two functionalizing agents. For example, a poly(arylene ether) may be reacted with two capping agents, or a poly(arylene ether) may be metalized and reacted with two unsaturated alkylating agents. In another alternative, a mixture of at least two poly(arylene ether) resins may be reacted with a single functionalizing agent.

The composition may comprise the functionalized poly(arylene ether) in an amount of comprising about 1 to about 90 parts by weight per 100 parts by weight total of the functionalized poly(arylene ether) and the olefinically unsaturated monomer. Within this range, it may be preferred to use a functionalized poly(arylene ether) amount of at least about 10 parts by weight, more preferably at least about 20 parts by weight, still more preferably at least about 30 parts by weight. Also within this range, it may be preferred to use a functionalized poly(arylene ether) amount of up to about 80 parts by weight, more preferably up to about 70 parts by weight, yet more preferably up to about 60 parts by weight, still more preferably up to about 50 parts by weight.

The composition further comprises an olefinically unsaturated monomer. Such olefinically unsaturated monomers include, for example, the curable monomer compositions described in U.S. Pat. No. 6,352,782 to Yeager et al. Preferred olefinically unsaturated monomers include alkenyl aromatic monomers, acryloyl monomers, allylic monomers, and mixtures thereof. Generally, the amount of the olefinically unsaturated monomer will be about 10 to about 99 parts by weight, based on 100 parts by weight total of the functionalized poly(arylene ether) and the olefinically unsaturated monomer.

The olefinically unsaturated monomer may comprise an alkenyl aromatic monomer. The alkenyl aromatic monomer may have the structure

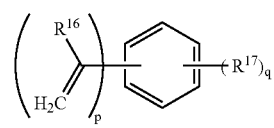

wherein each $R^{16}$ is independently hydrogen, $C_1$-$C_{12}$ alkyl, $C_2$-$C_{12}$ alkenyl, $C_2$-$C_{12}$ alkynyl, $C_6$-$C_{18}$ aryl, or the like; each $R^{17}$ is independently hydrogen, halogen, $C_1$-$C_{12}$ alkyl, $C_1$-$C_{12}$ alkoxyl, $C_6$-$C_{18}$ aryl, or the like; p is 1 to 4; and q is 0 to 5. The sum of p and q is 1, 2, 3, 4, 5, or 6. When p=1, the alkenyl aromatic monomer is termed a monofunctional alkenyl aromatic monomer; when p=2-4, the alkenyl aromatic monomer is termed a polyfunctional alkenyl aromatic monomer. Suitable alkenyl aromatic monomers include styrene, alpha-methylstyrene, alpha-ethylstyrene, alpha-isopropylstyrene, alpha-tertiary-butylstyrene, alpha-phenylstyrene, and the like; halogenated styrenes such as chlorostyrene, dichlorostyrene, trichlorostyrene, bromostyrene, dibromostyrene, tribromostyrene, fluorostyrene, difluorostyrene, trifluorostyrene, tetrafluorostyrene, pentafluorostyrene, and the like; halogenated alkylstyrenes such as chloromethylstyrene, and the like; alkoxystyrenes such as methoxystyrene, ethoxystyrene, and the like; polyfunctional alkenyl aromatic monomers such as 1,2-divinylbenzene, 1,3-divinylbenzene, 1,4-divinylbenzene, trivinylbenzenes, 1,3-diisopropenylbenzene, 1,4-diisopropenylbenzene, and the like; and mixtures comprising at least one of the foregoing alkenyl aromatic monomers. In the foregoing substituted styrenes for which no substituent position is specified, the substituents may occupy any free position on the aromatic ring.

Preferred alkenyl aromatic monomers include styrene, alpha-methylstyrene, 2-methylstyrene, 3-methylstyrene, 4-methylstyrene, 2-t-butylstyrene, 3-t-butylstyrene, 4-t-butylstyrene, 1,3-divinylbenzene, 1,4-divinylbenzene, 1,3-diisopropenylbenzene, 1,4-diisopropenylbenzene, and the like, and mixtures comprising at least one of the foregoing alkenyl aromatic monomers. Preferred alkenyl aromatic monomers further include styrenes having from 1 to 5 halogen substituents on the aromatic ring, and mixtures comprising at least one such halogenated styrene.

Alkenyl aromatic monomers are commercially available from numerous sources. They may also be prepared by methods known in the art.

When the olefinically unsaturated monomer comprises an alkenyl aromatic monomer, it preferably may be used in an amount of about 10 to about 90 parts by weight per 100 parts by weight total of the functionalized poly(arylene ether) and the alkenyl aromatic monomer. Within this range, it may be preferred to use an alkenyl aromatic monomer amount of at least about 20 parts by weight, more preferably at least about 30 parts by weight. Also within this range, it may be preferred to use an alkenyl aromatic monomer amount of up to about 80 parts by weight, more preferably up to about 70 parts by weight, yet more preferably up to about 60 parts by weight, still more preferably up to about 50 parts by weight.

The olefinically unsaturated monomer may comprise an acryloyl monomer. In one embodiment, the acryloyl monomer comprises at least one acryloyl moiety having the structure

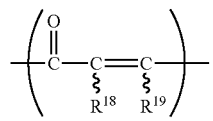

wherein $R^{18}$ and $R^{19}$ are each independently hydrogen, $C_1$-$C_{12}$ alkyl, or the like; and wherein $R^{18}$ and $R^{19}$ may be disposed either cis or trans about the carbon-carbon double bond. Preferably, $R^{18}$ and $R^{19}$ are each independently hydrogen or methyl. In one embodiment, the acryloyl monomer comprises at least two acryloyl moieties having the above structure and is termed a polyfunctional acryloyl monomer. In another embodiment, the acryloyl monomer comprises at least three acryloyl moieties having the above structure.

In one embodiment, the acryloyl monomer comprises at least one acryloyl moiety having the structure

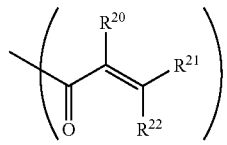

wherein $R^{20}$-$R^{22}$ are each independently hydrogen, $C_1$-$C_{12}$ alkyl, $C_2$-$C_{12}$ alkenyl, $C_6$-$C_{18}$ aryl, $C_7$-$C_{18}$ alkyl-substituted aryl, $C_7$-$C_{18}$ aryl-substituted alkyl, $C_2$-$C_{12}$ alkoxycarbonyl, $C_7$-$C_{18}$ aryloxycarbonyl, $C_8$-$C_{18}$ alkyl-substituted aryloxycarbonyl, $C_8$-$C_{18}$ aryl-substituted alkoxycarbonyl, nitrile, formyl, carboxylate, imidate, thiocarboxylate, or the like. Preferably, $R^{20}$-$R^{22}$ are each independently hydrogen or methyl. In one embodiment, the acryloyl monomer comprises at least two acryloyl moieties having the structure above. In another embodiment, the acryloyl monomer comprises at least three acryloyl moieties having the structure above.

Many additional suitable acryloyl monomers are described in U.S. Published Application No. 2001/0053820 A1 to Yeager et al.

In a preferred embodiment, the acryloyl monomer may include compounds having at least two acryloyl moieties per molecule, more preferably at least three acryloyl moieties per molecule. Illustrative examples include compounds produced by condensation of an acrylic or methacrylic acid with a di-epoxide, such as bisphenol-A diglycidyl ether, butanediol diglycidyl ether, or neopenylene glycol dimethacrylate. Specific examples include 1,4-butanediol diglycidylether di(meth)acrylate, bisphenol A diglycidylether dimethacrylate, and neopentylglycol diglycidylether di(meth)acrylate, and the like. Also included as acryloyl monomers are the condensation of reactive acrylate or methacrylate compounds with alcohols or amines to produce the resulting polyfunctional acrylates or polyfunctional acrylamides. Examples include N,N-bis(2-hydroxyethyl)(meth)acrylamide, methylenebis((meth)acrylamide), 1,6-hexamethylenebis((meth)acrylamide), diethylenetriamine tris((meth)acrylamide), bis(gamma-((meth)acrylamide)propoxy)ethane, beta-((meth)acrylamide) ethylacrylate, ethylene glycol di((meth)acrylate)), diethylene glycol di(meth)acrylate, tetraethylene glycol di(meth)acrylateglycerol di(meth)acrylate, glycerol tri(meth)acrylate, 1,3-propylene glycol di(meth)acrylate, dipropyleneglycol di(meth)acrylate, 1,4-butanediol di(meth)acrylate, 1,2,4-butanetriol tri(meth)acrylate, 1,6-hexanedioldi(meth)acrylate, 1,4-cyclohexanediol di(meth)acrylate, 1,4-benzenediol di(meth)acrylate, pentaerythritoltetra(meth)acrylate, 1,5-pentanediol di(meth)acrylate, trimethylolpropane di(meth)acrylate, trimethylolpropane tri(meth)acrylate), 1,3,5-triacryloylhexahydro-1,3,5-triazine, 2,2-bis(4-(2-(meth)acryloxyethoxy)phenyl)propane, 2,2-bis(4-(2-(meth)acryloxyethoxy)-3,5-dibromophenyl)propane, 2,2-bis((4-(meth)acryloxy)phenyl)propane, 2,2-bis((4-(meth)acryloxy)-3,5-dibromophenyl)propane, and the like, and mixtures comprising at least one of the foregoing acryloyl monomers. It will be understood that the fragment "(meth)acryl-" denotes either "acryl-" or "methacryl-".

Highly preferred acryloyl monomers include trimethylolpropane tri(meth)acrylate, 1,6-hexanediol di(meth)acrylate, ethylene glycol di(meth)acrylate, propylene glycol di(meth)

acrylate, cyclohexanedimethanol di(meth)acrylate, butanedioldi(meth)acrylate, diethylene glycol di(meth)acrylate, triethylene glycol di(meth)acrylate, isobornyl(meth)acrylate, cyclohexyl (meth)acrylate, butyl(meth)acrylate, methyl (meth)acrylate, dibutyl fumarate, dibutyl maleate, glycidyl (meth)acrylate, ethyl (meth)acrylate, 2-ethylhexyl (meth) acrylate, hexyl (meth)acrylate, lauryl (meth)acrylate, stearyl (meth)acrylate, decyl (meth)acrylate, octyl (meth)acrylate, and the like, and mixtures comprising at least one of the foregoing acryloyl monomers.

Acryloyl monomers are commercially available from numerous sources. They may also be prepared by methods known in the art.

When the olefinically unsaturated monomer comprises an acryloyl monomer, it preferably may be used in an amount of about 1 to about 50 parts by weight per 100 parts by weight total of the functionalized poly(arylene ether) and the acryloyl monomer. Within this range, it may be preferred to use an acryloyl monomer amount of at least about 5 parts by weight, more preferably at least about 10 parts by weight. Also within this range, it may be preferred to use an acryloyl monomer amount of up to about 40 parts by weight, more preferably up to about 30 parts by weight, yet more preferably up to 20 parts by weight.

The olefinically unsaturated monomer may comprise an allylic monomer. An allylic monomer is an organic compound comprising at least one allyl ($-CH_2-CH=CH_2$) moiety. In one embodiment, the allylic monomer comprises at least two allyl moieties. In another embodiment, the allylic monomer comprises at least three allyl moieties. Suitable allylic monomers include, for example, allyl benzene, diallyl phthalate, diallyl isophthalate, triallyl mellitate, triallyl mesate, triallyl benzenes, triallyl cyanurate, triallyl isocyanurate, mixtures thereof, partial polymerization products prepared therefrom, and the like Nanofillers used in the composition may have a regular or irregular shape. They may be platelets, fibers, spherical, needle shaped, agglomerates or any other shape or combination of shapes provided that the nanofiller dispersed in the composition has no linear dimension greater than 1000 nanometers, preferably no linear dimension greater than about 500 nanometers, more preferably no linear dimension greater than about 100 nanometers, still more preferably no linear dimension greater than 10 nanometers, even more preferably no linear dimension greater than 1 nanometer. The filler added to the resin components may comprise a micron sized aggregate of nanofiller that upon formation of the curable composition disperses to nanofiller. When dispersed in the curable composition, the nanofiller may be distributed in either a continuous phase, multiple continuous phases when more than one continuous phase is present, or a dispersed phase. The nanofiller may, optionally, have an aspect ratio of about 1 to about 1000. In some embodiments it may be preferred to use a nanofiller having an aspect ratio of at least about 10 to 1, more preferably at least about 30 to 1, still more preferably at least about 100 to 1, even more preferably at least about 300 to 1.

The nanofiller is also not restricted by composition and it is envisioned that the inclusion of any known nanofiller in the curable composition will be useful. Nanofillers can provide surprising properties to a composition due, in part, to the fact that a high proportion of the atoms of the nanofiller reside at the surface of the nanofiller particle and can interact with the resin components. Nanofillers may comprise carbon; metal oxides including main group metal oxides such as aluminum oxide and transition metal oxides such as one or more of the titanium oxides; metal carbides; cermet materials; ceramics; glass; perovskites; layered inorganic materials; fibrillar inorganic materials; and the like; and combinations of the foregoing.

Illustrative of useful fibrillar materials are imogolite and vanadium oxide. Layered materials vary widely and include phyllosilicates. Illustrative of such materials are smectite clay minerals such as montmorillonite, nontronite, beidellite, volkonskoite, hectorite, saponite, sauconite, magadiite, kenyaite; and vermiculite. Other useful layered materials include illite minerals such as ledikite and admixtures of illites with the clay minerals named above. Other useful layered materials, are the layered double hydroxides, such as $Mg_6Al_{3.4}(OH)_{18.8}(CO_3)_{1.7}H_2O$. Other layered materials include chlorides such as $FeCl_3$ and $FeOCl$; chalcogenides such as $TiS_2$, $MoS_2$, and $MoS_3$; cyanides such as $Ni(CN)_2$; and oxides such as $H_2Si_2O_5$, $V_6O_{13}$, $HTiNbO_5$, $Cr_{0.5}V_{0.5}S_2$, $W_{0.2}V_{2.8}O_7$, $Cr_3O_8$, $MoO_3(OH)_2$, $VOPO_4$--$2H_2O$, $CaPO_4CH_3$——$H_2O$, $MnHAsO_4$——$H_2O$, $Ag_6Mo_{10}O_{33}$, and the like.

Useful layered and fibrillar inorganic materials include those that have been swollen and intercalated between layers or fibrils with an organophilic intercalant which weakens the interlayer cohesive energy between layers and fibrils by swelling the interlayer or interfibril distances. In a preferred embodiment, the intercalant or intercalants increase the compatibility and bonding of the layers or fibrils with the resin components of the curable composition by having attractive interactions with both the surfaces of the fibrils or layers and the polymers. Intercalants that function to swell interlayer or interfibril distances are sometimes referred to as "swelling agents," intercalants which function to increase the compatibility and bonding of the layers or fibrils with the curable or cured composition are sometimes referred to as "compatibilizing agents" and intercalants that function as swelling agents and compatibilizing agents are sometimes referred to as "swelling/compatibilizing agents." The intercalants may be introduced into the interlayer or interfibril spaces by either insertion, in the case of neutral molecules, or ion exchange, in the case of ions. The intercalants may be introduced in the form of a solid, liquid, gas, or solute. The intercalants may be introduced into the spaces between every layer or fibril, nearly every layer or fibril, or a large fraction of the layers or fibrils of the material. Intercalants can be used singly or as a combination of intercalants.

Suitable nanofillers further include swellable layered inorganic materials. Typically, the layered inorganic material comprises layers having two opposing faces that may be relatively flat or slightly curved. Such materials are described in U.S. Pat. No. 4,889,885 to Usuki et al. Representative examples of swellable layered inorganic materials include the inorganic layered silicates such as montmorillonite, nontronite, beidellite, volkonskoite, hectorite, saponite, sauconite, magadiite, medmontite, kenyaite and vermiculite. Other layered materials or multilayered aggregates having little or no charge on the surface of the layers may also be used provided they can be intercalated with swelling agents that expand their interlayer spacing. Conversely, layered materials having more charge than those previously cited such as members of the mica family may also be used provided they can be intercalated with swelling agents that expand their interlayer spacing. Mixtures of one or more such materials may also be employed.

Additional representative examples of layered materials include illite minerals such as ledikite; the layered double hydroxides or mixed metal hydroxides such as $Mg_6Al_{3.4}(OH)_{18.8}(CO_3)_{1.7}H_2O$ (see W. T. Reichle, Journal of Catalysis, volume 94, pages 547 ff. (1985)), which have positively charged layers and exchangeable anions in the interlayer spaces; chlorides such as $ReCl_3$ and FeOCl; chalcogenides such as $TiS_2$, $MoS_2$, and $MoS_3$; cyanides such as $Ni(CN)_2$; and oxides such as $H_2Si_2O_5$, $V_5O_{13}$, $HTiNbO_5$, $Cr_{0.5}V_{0.5}S_2$, $W_{0.2}V_{2.8}O_7$, $Cr_3O_8$, $MoO_3(OH)_2$, $VOPO_4$--$2H_2O$, $CaPO_4CH_3$——$H_2O$, $MnHAsO_4$——$H_2O$, $Ag_6Mo_{10}O_{33}$, and the like Other swellable layered inorganic materials or multi-layer aggregates having little or no charge on the surface of the layers may also be used provided they can be intercalated with swelling agents that expand their interlayer spacing. Mixtures of one or more such materials may also be employed.

The preferred swellable layered inorganics include those having charges on the layers and exchangeable ions such as sodium, potassium, and calcium cations, which can be exchanged, preferably by ion exchange, with ions, preferably onium ions such as ammonium cations, or reactive organosilane compounds, that cause the multi-lamellar particles to delaminate or swell. Typically, the negative charge on the surface of the swellable layered inorganic materials is at least 20 milliequivalents, preferably at least 50 milliequivalents, and more preferably from 50 to 150 milliequivalents, per 100 grams of the multilayered material. Particularly preferred are inorganic layered silicates such as montmorillonite, nontronite, beidellite, volkonskoite, hectorite, saponite, sauconite, magadiite, and kenyaite, with hectorite and montmorillonite having from 20 milliequivalents to 150 milliequivalents per 100 grams material. Preferred swellable layered inorganic materials are inorganic layered silicates having a negative charge on the layers ranging from 0.2 to 1.2 charges per formula unit, most preferred are inorganic layered silicates having a negative charge on the layers ranging from 0.2 to 0.9 charges per formula unit and a commensurate number of exchangeable cations in the interlayer spaces.

The swellable layered inorganic material can be rendered organophilic by a process known as "intercalation" that comprises introducing intercalants (neutral or charged species) into the interlayer or interfibril spaces of the swellable layered inorganic material by either insertion, in the case of neutral molecules, or ion exchange, in the case of ions. Intercalation can also increase the interlayer spacing of the swellable layered inorganic material. The term "interlayer or interfibril space or spacing" is meant herein the distance between the faces of the layers or the distance between fibrils. In the case of ions, the ions may be exchanged for larger species of the same charge such as, for example, the exchange of sodium or calcium ion with an onium cation. Any layered material described containing a neutral or charged species in the interlayer region that results in an increase of the layer spacing prior will be referred to as an intercalated material. This description also includes those layered materials that have been rendered organophilic. Such materials are commonly known as organoclays.

The intercalants act to weaken the interlayer cohesive energy by swelling the interlayer distances and function to increase the compatibility and bonding of the layers with the matrix by having attractive interaction with both the layers and other curable composition components. The intercalant may be introduced into the spaces between every layer or fibril, nearly every layer or fibril of the swellable layered inorganic material, or a significant fraction of the layers or fibrils. The processes of introducing intercalants into the interlayer areas of swellable layered materials are known to those skilled in the art. See, for example, U.S. Pat. No. 4,889,885 to Usuki et al. It is not intended that these methods are limited to any specific process or procedure.

Intercalants typically contain a functional group that reacts with the surface of the layers of the layered material and displaces, totally or in part, the original ions, and bonds to the surface of the layers. These functional groups that are reactive with the polymer include nucleophilic or electrophilic functional groups that are capable of electrophilic or nucleophilic displacement reactions, coupling reactions and varying ring opening reactions. Examples of such functional groups include amino, carboxy, acylhalide, acyloxy, hydroxy, isocyanato, ureido, halo, epoxy, epichlorohydrin, and the like.

Suitable intercalants include water-soluble polymers, onium compounds such as an ammonium, phosphonium or sulfonium salt, amphoteric surface-active agents, choline compounds, organosilane compounds, and mixtures thereof.

Representative examples of water-soluble polymers that can be employed as the organic intercalants are water-soluble polymers of vinyl alcohol such as poly(vinyl alcohol); polyalkylene glycols such as polyethylene glycol; water-soluble cellulose polymers such as methyl cellulose and carboxymethyl cellulose; the polymers of ethylenically unsaturated carboxylic acids such as poly(acrylic acid), and their salts; polyvinyl pyrrolidone; and mixtures of the foregoing water-soluble polymers. The monomer unit of such polymers may also be used such as ethylene glycol, or mixtures of ethylene glycol and propylene glycol, or propylene glycol.

Representative examples of onium compounds that can be employed as organic intercalants include cationic surface-active agents, such as quaternary ammonium salts having octadecyl, hexadecyl, tetradecyl, or dodecyl moieties; with preferred quaternary ammonium salts including octadecyl trimethyl ammonium salt, dioctadecyl dimethyl ammonium salt, hexadecyl trimethyl ammonium salt, dihexadecyl dimethyl ammonium salt, tetradecyl trimethyl ammonium salt, ditetradecyl dimethyl ammonium salt dihydroxyethyl methyl octadecyl ammonium salt, dihydroxyethyl methyl hydrogenated tallow ammonium salt, quaternary ammonium salts containing substituents incorporating polyoxyalkylene segments and salts of polyoxyalkylene polyamines, such as the JEFFAMINE® products of Huntsman Corp.

Representative examples of the amphoteric surface-active agents that can be employed as organic intercalants include surfactants having an aliphatic amine cationic moiety and a carboxyl, sulfate, sulfonate, or phosphate as the anionic moiety.

Representative examples of choline compounds that can be employed as the organic intercalants include [$HOCH_2CH_2N(CH_3)_3$]$^+OH^-$, $C_5H_{14}ClNO$, $C_5H_{14}NOC_4H_5O_6$, $C_5H_{14}NOC_6H_7O_7$, and $C_5H_{14}NOC_6H_{12}O_7$, and the like.

Representative examples of organosilane compounds that can be employed as the organic intercalants include silane agents of the formula:

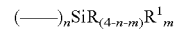

where (———) is a covalent bond to the surface of the layered material; m is 0, 1 or 2; n is 1, 2, or 3 with the proviso that the sum of m and n is equal to 3; $R^1$ is a nonhydrolyzable organic radical (including alkyl, alkoxyalkyl, alkylaryl, arylalkyl, and alkoxyaryl); R is the same or different at each occurrence and is an organic radical that is reactive with at least one component of the curable composition. Representative R groups include amino, carboxy, acylhalide, acyloxy, hydroxy, isocyanato ureido, halo, epoxy, epichlorohydryl, and the like. Preferred organosilane intercalants include long-chain branched quaternary ammonium salts and/or suitably functionalized organosilane compounds, as disclosed in WO 93/11190, pages 9-21.

Organic materials other than those described can also be employed as the organic intercalants provided they can be intercalated between the layers of the multilayered particulate material.

In one embodiment, the intercalated layered material is an intercalated silicate having a layer thickness of from 7 Angstroms to 12 Angstroms. This layer thickness does not include the thickness of the intercalant moiety.

Suitable nanofillers include polyhedral oligomeric silsesquioxanes (so-called "POSS nanofillers"). Representative POSS nanofillers are described in "Interfacial Properties of POSS-Nanofillers," J. Polidan et al., American Physical Society March 2002 Meeting, Session M33, Poster Session IV (http://www.eps.org/aps/meet/MAR02/baps/abs/S4735035.html). POSS nanofillers are also commercially available as, for example, 1,3,5,7,9,11,13,15-Octa(2-dichloromethylsilyl)ethyl)pentacyclo-[9.5.1.1$^{3,9}$.1$^{5,15}$.1$^{7,13}$]octasiloxane (Chemical Abstracts Registry No. 314727-18-9), Octakis(tetramethylammonium) pentacyclo[9.5.1.1$^{3,9}$.1$^{5,15}$.1$^{7,13}$]octasiloxane-1,3,5,7,9,11,13,15-octakis(yloxide) hydrate (Chemical Abstracts Registry No. 69667-29-4), and 1,3,5,7,9,11,13,15-Octavinylpentacyclo[9.5.1.1$^{3,9}$.1$^{5,15}$.1$^{7,13}$] octasiloxane (Chemical Abstracts Registry No. 69655-76-1), all available from Aldrich Chemical Company.

Suitable nanofillers further include nano-dispersed powders comprising nanoscale powders dispersed on coarser carrier powders as described, for example, in U.S. Pat. No. 6,652,967 to Yadav et al.; metal nanocrystals imbedded in another metal having a different work function as described, for example, in U.S. Pat. No. 6,646,302 to Kan et al.; and spray-dispensible nanofiller compositions as described, for example, in U.S. Pat. No. 6,645,569 to Cramer et al.

Nanofillers further include carbon nanofibers and carbon nanotubes such as, for example, those commercially available under the tradename PYROGRAF® from Applied Sciences Inc.; the single-walled nanotubes commercially available from CarboLex Inc.; the carbon nanofibers or "fibrils" having diameters of about 10 to about 15 nanometers commercially available from Hyperion Catalysis International. Suitable organoclays include the montmorillonite nanoclays commercially available from Nanocor; and the organically-modified, layered magnesium aluminum silicate platelets commercially available under the tradename CLOISITE® from Southern Clay Products.

In one embodiment, the nanofiller is substantially free of conductive carbon. In this embodiment, the nanofiller excludes forms of conductive carbon having no linear dimension greater than 1000 nanometers, such as, for example, carbon nanotubes having lengths less than 1000 nanometers, carbon fibers having lengths less than 1000 nanometers, and graphite particles having no linear dimension greater than 1000 nanometers.

The composition may comprise the nanofiller in an amount of about 0.5 to about 80 weight percent, based on the total weight of the composition. Within this range, it may be preferred to use a nanofiller amount of at least about 1 weight percent, more preferably at least about 1.5 weight percent. Also within this range, it may be preferred to use a nanofiller amount of up to about 70 weight percent, more preferably up to about 50 weight percent, yet more preferably up to 40 weight percent.

The composition may, optionally, further comprise a curing catalyst to increase the curing rate of the unsaturated components. Curing catalysts, also referred to as initiators, are well known to the art and used to initiate the polymerization, cure or crosslink any of numerous thermoplastics and thermosets including unsaturated polyester, vinyl ester and allylic thermosets. Non-limiting examples of curing catalysts are those described in "Plastic Additives Handbook, 4$^{th}$ Edition" R. Gachter and H. Muller (eds.), P. P. Klemchuck (assoc. ed.) Hansen Publishers, New York 1993, and in U.S. Pat. No. 5,407,972 to Smith et al., and U.S. Pat. No. 5,218,030 to Katayose et al. The curing catalyst for the unsaturated portion of the thermoset may include any compound capable of producing radicals at elevated temperatures. Such curing catalysts may include both peroxy and non-peroxy based radical initiators. Examples of useful peroxy initiators include, for example, benzoyl peroxide, dicumyl peroxide, methyl ethyl ketone peroxide, lauryl peroxide, cyclohexanone peroxide, t-butyl hydroperoxide, t-butyl benzene hydroperoxide, t-butyl peroctoate, 2,5-dimethylhexane-2,5-dihydroperoxide, 2,5-dimethyl-2,5-di(t-butylperoxy)-hex-3-yne, di-t-butylperoxide, t-butylcumyl peroxide, alpha,alpha'-bis(t-butylperoxy-m-isopropyl)benzene, 2,5-dimethyl-2,5-di(t-butylperoxy)hexane, dicumylperoxide, di(t-butylperoxy isophthalate, t-butylperoxybenzoate, 2,2-bis(t-butylperoxy)butane, 2,2-bis(t-butylperoxy)octane, 2,5-dimethyl-2,5-di(benzoylperoxy)hexane, di(trimethylsilyl)peroxide, trimethylsilylphenyltriphenylsilyl peroxide, methacryloxypropyl trimethoxysilane, ethoxylated bisphenol A di(meth)acrylate, and the like, and mixtures comprising at least one of the foregoing curing catalysts. Typical non-peroxy initiators include, for example, 2,3-dimethyl-2, 3-diphenylbutane, 2,3-trimethylsilyloxy-2,3-diphenylbutane, and the like, and mixtures comprising at least one of the foregoing curing catalysts. The curing catalyst for the unsaturated portion of the thermoset may further include any compound capable of initiating anionic polymerization of the unsaturated components. Such anionic polymerization catalysts include, for example, alkali metal amides, such as sodium amide (NaNH$_2$) and lithium diethyl amide (LiN(C$_2$H$_5$)$_2$); alkali metal and ammonium salts of C$_1$-C$_{10}$ alkoxides; alkali metal and ammonium hydroxides; alkali metal cyanides; organometallic compounds such as the alkyl lithium compound n-butyl lithium and the grignard reagent phenyl magnesium bromide; and the like; and combinations comprising at least one of the foregoing anionic polymerization catalysts.

In a preferred embodiment, the curing catalyst may comprise t-butylperoxybenzoate or methyl ethyl ketone peroxide. The curing catalyst may promote curing at a temperature of about 0° C. to about 200° C.

When present, the curing catalyst may be used in an amount of about 0.1 to about 10 parts by weight per 100 parts total of the functionalized poly(arylene ether) and the olefinically unsaturated monomer. Within this range, it may be preferred to use a curing catalyst amount of at least about 0.5 parts by weight, more preferably at least about 1 part by weight. Also within this range, it may be preferred to use a curing catalyst amount of up to about 5 parts by weight, more preferably up to about 3 parts by weight.

The composition may, optionally, further comprise a curing promoter to decrease the gel time. Suitable curing promoters include transition metal salts and complexes such as cobalt naphthanate; and organic bases such as N,N-dimethylaniline (DMA) and N,N-diethylaniline (DEA). Preferably, cobalt naphthanate and DMA are used in combination. When present, the promoter may be used in an amount of about 0.05 to about 3 parts, per 100 parts total of the functionalized poly(arylene ether), the alkenyl aromatic monomer, and the acryloyl monomer.

The composition may comprise an optional polymeric additive. The polymeric additive has a glass transition temperature less than or equal to 100° C., preferably less than or equal to 75° C., more preferably less than or equal to 50° C., even more preferably less than or equal to 25° C., even more preferably less than or equal to 0° C. The polymeric additive has a Young's modulus less than or equal to 1000 MPa at 25° C., preferably less than or equal to 100 MPa at 25° C., more preferably less than or equal to 10 MPa at 25° C. In one embodiment suitable polymeric additives are selected from the group consisting of poly(alkenyl hydrocarbon)s, poly(alkyl (meth)acrylate)s, poly(vinyl ester)s, polysiloxanes, and combinations comprising at least one of the foregoing polymeric additives.

The polymeric additive, when present, may be used in an amount of about 0.1 to about 30 parts by weight, based on 100 parts by weight total of the functionalized poly(arylene ether), the olefinically unsaturated monomer, and the polymeric additive. Within this range it may be preferred to use a polymeric additive amount of at least about 0.5 parts by weight, more preferably at least about 1 parts by weight, yet more preferably at least about 2 parts by weight, still more preferably at least about 5 parts by weight, even more preferably at least about 8 parts by weight. Also within this range, it may be preferred to use a polymeric additive amount of up to about 25 parts by weight, more preferably up to about 20 parts by weight, still more preferably up to about 15 parts by weight. In general, it is preferred to use a polymeric additive amount that is less than the so-called critical point of the composition. The critical composition defines the additive level above which the phase separated additive changes from being a minor, dispersed phase, into being a continuous phase. The critical composition for a binary blend can be estimated using a thermodynamically derived equation and the component specific volumes (i.e., molecular weight/density). For a multi-component base resin, an average specific volume can be estimated. The critical volume fraction composition of component 1 is calculated as the reciprocal of the quantity 1 plus the square root of the ratio of component 1 specific volume over component 2 specific volume, as described in T. A. Callaghan, and D. R. Paul, *Macromolecules* (1993), volume 26, pages 2439-2450; and I. C. Sanchez, *Polymer* (1989), volume 30, pages 471-475.

The composition may further comprise one or more non-nanofillers, including particulate fillers and fibrous fillers. Non-nanofillers have at least one linear dimension that is greater than about 1000 nanometers. Examples of such fillers well known to the art include those described in "Plastic Additives Handbook, 4$^{th}$ Edition" R. Gachter and H. Muller (eds.), P. P. Klemchuck (assoc. ed.) Hansen Publishers, New York 1993. A particulate filler is herein defined as a filler having an average aspect ratio less than about 5:1. Non-limiting examples of fillers include silica powder, such as fused silica and crystalline silica; boron-nitride powder and boron-silicate powders for obtaining cured products having low dielectric constant and low dielectric loss tangent; the above-mentioned powder as well as alumina, and magnesium oxide (or magnesia) for high temperature conductivity; and fillers, such as wollastonite including surface-treated wollastonite, calcium sulfate (as its anhydride, dihydrate or trihydrate), calcium carbonate including chalk, limestone, marble and synthetic, precipitated calcium carbonates, generally in the form of a ground particulate which often comprises 98+% $CaCO_3$ with the remainder being other inorganics such as magnesium carbonate, iron oxide, and alumino-silicates; surface-treated calcium carbonates; talc, including fibrous, modular, needle shaped, and lamellar talc; glass spheres, both hollow and solid, and surface-treated glass spheres typically having coupling agents such as silane coupling agents and/or containing a conductive coating; and kaolin, including hard, soft, calcined kaolin, and kaolin comprising various coatings known to the art to facilitate the dispersion in and compatibility with the thermoset resin; mica, including metallized mica and mica surface treated with aminosilanes or acryloylsilanes coatings to impart good physicals to compounded blends; feldspar and nepheline syenite; silicate spheres; flue dust; cenospheres; fillite; aluminosilicate (armospheres), including silanized and metallized aluminosilicate; natural silica sand; quartz; quartzite; perlite; Tripoli; diatomaceous earth; synthetic silica, including those with various silane coatings, and the like.

When present, the non-nanofiller may be used in an amount of about 0.5 to about 80 weight percent, based on the total weight of the composition. Within this range, it may be preferred to use an non-nanofiller amount of at least about 1 weight percent, more preferably at least about 1.5 weight percent. Also within this range, it may be preferred to use a non-nanofiller amount of up to about 70 weight percent, more preferably up to about 50 weight percent, yet more preferably up to 40 weight percent.

The nanofillers and optional non-nanofillers may be added to the thermosetting resin without any treatment, or after surface treatment, generally with an adhesion promoter.

The formulation may, optionally, further comprise an adhesion promoter to improve adhesion of the thermosetting resin to the filler or to an external coating or substrate. Also possible is treatment of the aforementioned inorganic fillers with adhesion promoter to improve adhesion. Adhesion promoters include chromium complexes, silanes, titanates, zirco-aluminates, propylene maleic anhydride copolymers, reactive cellulose esters and the like. Chromium complexes include those sold by DuPont under the tradename VOLAN®. Silanes include molecules having the general structure $(RO)_{(4-n)}SiY_n$ wherein n=1-3, R is an alkyl or aryl group and Y is a reactive functional group which can enable formation of a bond with a polymer molecule. Particularly useful examples of coupling agents are those having the structure $(RO)_3SiY$. Typical examples include vinyl-triethoxysilane, vinyl tris(2-methoxy)silane, γ-methacryloxypropyltrimethoxy silane, γ-aminopropyltriethoxysilane, γ-glycidoxypropyltrimethoxysilane, γ-mercaptopropyltrimethoxysilane. Titanates include those developed by S. J. Monte et al. in Ann. Chem. Tech Conf. SPI (1980), Ann. Tech Conf. Reinforced Plastics and Composite inst. SPI 1979, Section 16E, New Orleans; and S. J. Monte, Mod. Plastics Int. 14(1984) 6 pg. 2. Zirco-aluminates include those described by L. B. Cohen in Plastics Engineering 39 (1983) 11, pg. 29. The adhesion promoter may be included in the thermosetting resin itself, or coated onto any of the fillers described above to improve adhesion between the filler and the thermosetting resin. For example such promoters may be used to coat a silicate fiber or filler to improve adhesion of the resin matrix.

The composition may, optionally, further comprising an additive selected from flame retardants, mold release agents and other lubricants, antioxidants, thermal stabilizers, ultraviolet stabilizers, pigments, dyes, colorants, anti-static agents, conductive agents, curing promoters, and the like, and combinations comprising at least one of the foregoing additives. Selection of particular additives and their amounts may be performed by those skilled in the art.

There is no particular limitation on the method by which the composition is prepared. The composition may be prepared by forming an intimate blend of the functionalized poly(arylene ether), the alkenyl aromatic and/or vinyl monomer, the acryloyl monomer, nanofiller and any optional components. When the functionalized poly(arylene ether) is a capped poly(arylene ether), the composition may be prepared directly from an uncapped poly(arylene ether) by dissolving the uncapped poly(arylene ether) in a portion of the alkenyl aromatic monomer, adding a capping agent form the capped poly(arylene ether) in the presence of the alkenyl aromatic monomer, and adding the acryloyl monomer, nanofiller, and any other components to form the thermoset composition. The nanofiller may be added as part of the bulk ingredients, or added by a masterbatch method.

In one embodiment, the nanofiller is mixed with a polymer to form a masterbatch and the masterbatch is then mixed with the functionalized poly(arylene ether) and olefinically unsaturated monomer. Alternatively, the nanofiller may be mixed with a solvent to form a nanofiller dispersion and the dispersion mixed with the functionalized poly(arylene ether) and the olefinically unsaturated monomer. The nanofiller dispersion may optionally include swelling agents, compatibilizing agents, swelling/compatibilizing agents and combinations of the foregoing.

In one embodiment, the composition may be formed by blending the functionalized poly(arylene ether), the olefinically unsaturated monomer, and the nanofiller with a mixing energy of less than about 50 kilojoules per liter (kJ/L), where the volume dimension expressed in liters refers to the volume at 25° C. of the composition being mixed. It is contemplated that the balance of physical and electrical properties of the cured composition may be sensitive to the manner in which the components in the curable composition are mixed. In particular it is contemplated that typical high-energy, high-shear methods favored for their effect on the mechanical properties of the cured composition may cause an undesirable reduction in the electrical conductivity. A desirable balance of mechanical and electrical properties may be obtained when the curable composition is mixed with a mixing energy less than about 50 kJ/L, preferably less than about 35 kJ/L, more preferably less than about 30 kJ/L. In order that mechanical properties of the composition are not unnecessarily compromised, it may be preferred to mix the components of the curable composition with a mixing energy of at least about 0.025 kJ/L, more preferably at least about 0.25 kJ/L, yet more preferably at least about 2.5 kJ/L.

There is no particular limitation on the apparatus used to blend the components of the curable composition. Suitable internal blending methods include dough mixing, Banbury mixing, helicone mixing, Henschel mixing, plow mixing, agitated vessel mixing, and the like, and combinations comprising at least one of the foregoing methods, which are known to those skilled in the art.

There is no particular limitation on the method by which the composition may be cured. The composition may, for example, be cured thermally or by using irradiation techniques, including UV irradiation and electron beam irradiation. When heat curing is used, the temperature selected may be about 80° to about 300° C. Within this range, a temperature of at least about 120° C. may be preferred. Also within this range, a temperature up to about 240° C. may be preferred. The heating period may be about 30 seconds to about 24 hours. Within this range, it may be preferred to use a heating time of at least about 1 minute, more preferably at least about 2 minutes. Also within this range, it may be preferred to use a heating time up to about 10 hours, more preferably about 5 hours, yet more preferably up to about 3 hours. Such curing may be staged to produce a partially cured and often tack-free resin, which then is fully cured by heating for longer periods or temperatures within the aforementioned ranges.

One embodiment is a curable composition, comprising: a (meth)acrylate-capped poly(2,6-dimethyl-1,4-phenylene ether); an acryloyl monomer comprising at least two acryloyl moieties; and a nanofiller. Another embodiment is a curable composition, comprising: about 1 to about 90 parts by weight of a (meth)acrylate-capped poly(2,6-dimethyl-1,4-phenylene ether); about 10 to about 99 parts by weight of an acryloyl monomer comprising at least two acryloyl moieties; and about 0.5 to about 80 weight percent of a nanofiller; wherein the amounts of the (meth)acrylate-capped poly(2,6-dimethyl-1,4-phenylene ether) and the acryloyl monomer are based on 100 parts by weight total of these components, and the amount of the nanofiller is based on the total weight of the composition.

Other embodiments include the reaction product obtained by partially or fully curing any of the above curable compositions.

Still other embodiments include articles comprising any of the cured compositions. Articles that may be fabricated from the composition include, for example, acid bath containers, neutralization tanks, electrorefining tanks, water softener tanks, fuel tanks, filament-wound tanks, filament-wound tank linings, electrolytic cells, exhaust stacks, scrubbers, engine valve covers, automotive exterior panels, automotive floor pans, automotive air scoops, truck bed liners, drive shafts, drive shaft couplings, tractor parts, transverse leaf springs, crankcase heaters, heat shields, railroad tank cars, hopper car covers, boat hulls, submarine hulls, boat decks, marine terminal fenders, aircraft components, propeller blades, missile components, rocket motor cases, wing sections, sucker rods, fuselage sections, wing skins, wing flairings, engine narcelles, cargo doors, aircraft stretch block and hammer forms, bridge beams, bridge deckings, stair cases, railings, walkways, pipes, ducts, fan housings, tiles, building panels, scrubbing towers, flooring, expansion joints for bridges, injectable mortars for patch and repair of cracks in structural concrete, grouting for tile, machinery rails, metal dowels, bolts, posts, electrical encapsulants, electronic packaging materials, electrical panels, printed circuit boards, electrical components, wire windings, seals for electromechanical devices, battery cases, resistors, fuses, thermal cut-off devices, coatings for printed wiring boards, capacitors, transformers, electrically conductive components for antistatic applications, tennis racquets, golf club shafts, fishing rods, skis, ski poles, bicycle parts, swimming pools, swimming pool slides, hot tubs, saunas, mixers, business machine housings, trays, dishwasher parts, refrigerator parts, furniture, garage doors, gratings, protective body gear, luggage, optical waveguides, radomes, satellite dishes, signs, solar energy panels, telephone switchgear housings, transformer covers, insulation for rotating machines, commutators, core insulation, dry toner resins, bonding jigs, inspection fixtures, industrial metal forming dies, vacuum molding tools, and the like.

The composition is particularly useful for fabricating automotive under hood components such as, for example, engine valve covers.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

All cited patents, patent applications, and other references are incorporated herein by reference in their entirety.

The invention claimed is:

1. A curable composition, comprising:
   a functionalized poly(arylene ether);
   an olefinically unsaturated monomer; and
   a nanofiller selected from the group consisting of montmorillonite, nontronite, beidellite, volkonskoite, hectorite, saponite, sauconite, magadiite, and kenyaite;
   wherein the nano filler has no linear dimension greater than 100 nanometers; and
   wherein the nanofiller is intercalated with an intercalant selected from the group consisting of water-soluble polymers, amphoteric surface-active agents comprising an aliphatic amine cationic moiety and a sulfonate or phosphate anionic moiety, choline compounds, organosilane compounds, and mixtures thereof.

2. The composition of claim 1, wherein the functionalized poly(arylene ether) is a capped poly(arylene ether) having the structure $$Q(J-K)_y$$

wherein Q is the residuum of a monohydric, dihydric, or polyhydric phenol; y is 1 to 100; J comprises repeating structural units having the formula

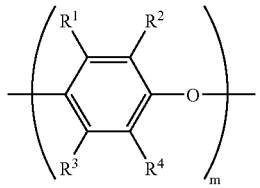

wherein $R^2$ and $R^4$ are each independently selected from the group consisting of halogen, primary or secondary $C_1$-$C_{12}$ alkyl, $C_2$-$C_{12}$ alkenyl, $C_2$-$C_{12}$ alkynyl, $C_1$-$C_{12}$ aminoalkyl, $C_1$-$C_{12}$ hydroxyalkyl, phenyl, $C_1$-$C_{12}$ haloalkyl, $C_1$-$C_{12}$ hydrocarbonoxy, and $C_2$-$C_{12}$ halohydrocarbonoxy wherein at least two carbon atoms separate the halogen and oxygen atoms; $R^1$ and $R^3$ are each independently selected from the group consisting of hydrogen, halogen, primary or secondary $C_1$-$C_{12}$ alkyl, $C_2$-$C_{12}$ alkenyl, $C_2$-$C_{12}$ alkynyl, $C_1$-$C_{12}$ aminoalkyl, $C_1$-$C_{12}$ hydroxyalkyl, phenyl, $C_1$-$C_{12}$ haloalkyl, $C_1$-$C_{12}$ hydrocarbonoxy, and $C_2$-$C_{12}$ halohydrocarbonoxy wherein at least two carbon atoms separate the halogen and oxygen atoms; m is 1 to about 200; and K is a capping group selected from the group consisting of

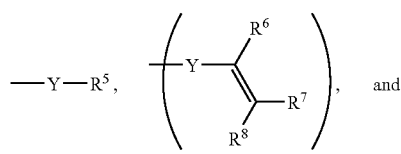

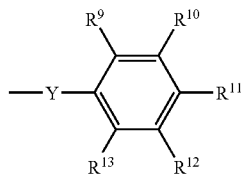

wherein $R^5$ is $C_1$-$C_{12}$ alkyl; $R^6$-$R^8$ are each independently selected from the group consisting of hydrogen, $C_1$-$C_{12}$ alkyl, $C_2$-$C_{12}$ alkenyl, $C_6$-$C_{18}$ aryl, $C_7$-$C_{18}$ alkyl-substituted aryl, $C_7$-$C_{18}$ aryl-substituted alkyl, $C_2$-$C_{12}$ alkoxycarbonyl, $C_7$-$C_{18}$ aryloxycarbonyl, $C_8$-$C_{18}$ alkyl-substituted aryloxycarbonyl, $C_8$-$C_{18}$ aryl-substituted alkoxycarbonyl, nitrile, formyl, carboxylate, imidate, and thiocarboxylate; $R^9$-$R^{13}$ are each independently selected from the group consisting of hydrogen, halogen, $C_1$-$C_{12}$ alkyl, hydroxy, and amino; and wherein Y is a divalent group selected from the group consisting of

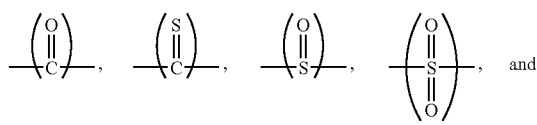

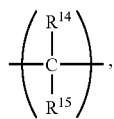

wherein $R^{14}$ and $R^{15}$ are each independently selected of the group consisting of hydrogen and $C_1$-$C_{12}$ alkyl.

3. The composition of claim 2, wherein Q is the residuum of a monohydric phenol.

4. The composition of claim 2, wherein the capped poly(arylene ether) comprises at least one capping group having the structure

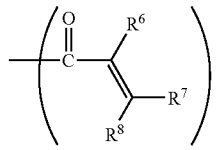

wherein $R^6$-$R^8$ are each independently selected from the group consisting of hydrogen, $C_1$-$C_{12}$ alkyl, $C_2$-$C_{12}$ alkenyl, $C_6$-$C_{18}$ aryl, $C_7$-$C_{18}$ alkyl-substituted aryl, $C_7$-$C_{18}$ aryl-substituted alkyl, $C_2$-$C_{12}$ alkoxycarbonyl, $C_7$-$C_{18}$ aryloxycarbonyl, $C_8$-$C_{18}$ alkyl-substituted aryloxycarbonyl, $C_8$-$C_{18}$ aryl-substituted alkoxycarbonyl, nitrile, formyl, carboxylate, imidate, and thiocarboxylate.

5. A curable composition, comprising:
   a functionalized poly(arylene ether); wherein the functionalized poly(arylene ether) is a ring-functionalized poly(arylene ether) comprising repeating structural units having the formula

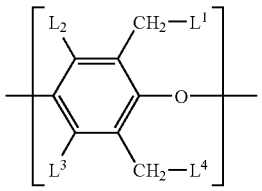

wherein each $L^1$-$L^4$ is independently hydrogen, an alkenyl group, or an alkynyl group; wherein the alkenyl group is represented by

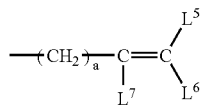

wherein $L^5$-$L^7$ are independently hydrogen or methyl, and a is an integer from 1 to 4; wherein the alkynyl group is represented by

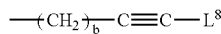

wherein $L^8$ is hydrogen, methyl, or ethyl, and b is an integer from 1 to 4; and wherein about 0.02 mole percent to about 25 mole percent of the total $L^1$-$L^4$ substituents in the ring-functionalized poly(arylene ether) are alkenyl and/or alkynyl groups;

an olefinically unsaturated monomer; and a nanofiller selected from the group consisting of montmorillonite, nontronite, beidellite, volkonskoite, hectorite, saponite, sauconite, magadiite, and kenyaite;

wherein the nanofiller has no linear dimension greater than 100 nanometers; and wherein the nanofiller is intercalated with an intercalant selected from the group of water-soluble polymers, amphoteric surface-active agents comprising an aliphatic amine cationic moiety and a sulfate or sulfate or sulfate or phosphate anionic moiety, choline compounds, organosilane compounds, and mixtures thereof.

6. The composition of claim 1, comprising about 1 to about 90 parts by weight of the functionalized poly(arylene ether) per 100 parts by weight total of the functionalized poly(arylene ether) and the olefinically unsaturated monomer.

7. The composition of claim 1, wherein the olefinically unsaturated monomer comprises an alkenyl aromatic monomer, an acryloyl monomer, an allylic monomer, or a mixture thereof.

8. The composition of claim 1, comprising about 10 to about 99 parts by weight of the olefinically unsaturated monomer per 100 parts by weight total of the functionalized poly(arylene ether) and the olefinically unsaturated monomer.

9. The composition of claim 1, wherein the olefinically unsaturated monomer comprises an alkenyl aromatic monomer.

10. The composition of claim 9, wherein the alkenyl aromatic monomer has the structure

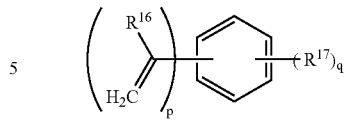

wherein each $R^{16}$ is independently selected from the group consisting of hydrogen, $C_1$-$C_{12}$ alkyl, $C_2$-$C_{12}$ alkenyl, $C_2$-$C_{12}$ alkynyl, and $C_6$-$C_{18}$ aryl; each $R^{17}$ is independently selected from the group consisting of halogen, $C_1$-$C_{12}$ alkyl, $C_1$-$C_{12}$ alkoxyl, and $C_6$-$C_{18}$ aryl; p is 1 to 4; and q is 0 to 5.

11. The composition of any of claim 9, wherein the alkenyl aromatic monomer comprises is selected from selected from the group consisting of styrene, alpha-methylstyrene, 2-methylstyrene, 3-methylstyrene, 4-methylstyrene, 2-t-butylstyrene, 3-t-butylstyrene, 4-t-butylstyrene, 1,3-divinylbenzene, 1,4-divinylbenzene, 1,3-diisopropenylbenzene, 1,4-diisopropenylbenzene, styrenes having from 1 to 5 halogen substituents on the aromatic ring, and mixtures thereof.

12. The composition of claim 9, comprising about 10 to about 99 parts by weight of the alkenyl aromatic monomer per 100 parts by weight total of the functionalized poly(arylene ether) and the alkenyl aromatic monomer.

13. The composition of claim 1, wherein the olefinically unsaturated monomer comprises an acryloyl monomer.

14. The composition of claim 13, wherein the acryloyl monomer comprises at least one acryloyl moiety having the structure

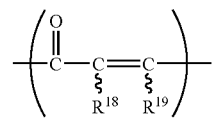

wherein $R^{18}$ and $R^{19}$ are each independently selected from the group consisting of hydrogen and $C_1$-$C_{12}$ alkyl, and wherein $R^{18}$ and $R^{19}$ may be disposed either cis or trans about the carbon-carbon double bond.

15. The composition of claim 13, wherein the acryloyl monomer comprises at least one acryloyl moiety having the structure

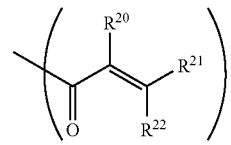

wherein $R^{20}$-$R^{22}$ are each independently selected from the group consisting of hydrogen, $C_1$-$C_{12}$ alkyl, $C_2$-$C_{12}$ alkenyl, $C_6$-$C_{18}$ aryl, $C_7$-$C_{18}$ alkyl-substituted aryl, $C_7$-$C_{18}$ aryl-substituted alkyl, $C_2$-$C_{12}$ alkoxycarbonyl, $C_7$-$C_{18}$ aryloxycarbonyl, $C_8$-$C_{18}$ alkyl-substituted aryloxycarbonyl, $C_8$-$C_{18}$ aryl-substituted alkoxycarbonyl, nitrile, formyl, carboxylate, imidate, and thiocarboxylate.

16. The composition of claim 15, wherein the acryloyl monomer comprises at least two acryloyl moieties.

17. The composition of claim 13, wherein the acryloyl monomer is selected from the group consisting of trimethylolpropane tri(meth)acrylate, 1,6-hexanediol di(meth)acrylate, ethylene glycol di(meth)acrylate, propylene glycol di(meth)acrylate, cyclohexanedimethanol di(meth)acrylate, butanediol di(meth)acrylate, diethylene glycol di(meth)acrylate, triethylene glycol di(meth)acrylate, isobornyl (meth)acrylate, methyl (meth)acrylate, and mixtures thereof.

18. The composition of claim 13, comprising about 1 to about 50 parts by weight of the acryloyl monomer per 100 parts by weight total of the functionalized poly(arylene ether) and the acryloyl monomer.

19. The composition of claim 1, wherein the olefinically unsaturated monomer comprises an allylic monomer selected from the group consisting of diallyl phthalate, diallyl isophthalate, triallyl mellitate, triallyl mesate, triallyl benzenes, triallyl cyanurate, triallyl isocyanurate, mixtures thereof and partial polymerization products prepared therefrom.

20. The composition of claim 1, comprising about 0.5 to about 80 weight percent nanofiller, based on the total weight of the composition.

21. The composition of claim 1, further comprising a curing catalyst.

22. The composition of claim 21, wherein the curing catalyst comprises at least one curing catalyst selected from the group consisting of benzoyl peroxide, dicumyl peroxide, methyl ethyl ketone peroxide, lauryl peroxide, cyclohexanone peroxide, t-butyl hydroperoxide, t-butyl benzene hydroperoxide, t-butyl peroctoate, 2,5-dimethylhexane-2,5-dihydroperoxide, 2,5-dimethyl-2,5-di(t-butylperoxy)-hex-3-yne, di-t-butylperoxide, t-butylcumyl peroxide, alpha,alpha'-bis(t-butylperoxy-m-isopropyl)benzene, 2,5-dimethyl-2,5-di(t-butylperoxy)hexane, dicumylperoxide, di(t-butylperoxy isophthalate, t-butylperoxybenzoate, 2,2-bis(t-butylperoxy)butane, 2,2-bis(t-butylperoxy)octane, 2,5-dimethyl-2,5-di(benzoylperoxy)hexane, di(trimethylsilyl) peroxide, trimethylsilylphenyltriphenylsilyl peroxide, 2,3-dimethyl-2,3-diphenylbutane, 2,3-trimethylsilyloxy-2,3-diphenylbutane, methacryloxypropyl trimethoxysilane, ethoxylated bisphenol A di(meth)acrylate, and mixtures thereof.

23. The composition of claim 1, further comprising a non-nanofiller.

24. The composition of claim 1, further comprising an additive selected from the group consisting of flame retardants, mold release agents and other lubricants, antioxidants, thermal stabilizers, ultraviolet stabilizers, pigments, dyes, colorants, anti-static agents, conductive agents, curing promoters, and combinations thereof.

25. The composition of claim 1, further comprising a polymeric additive having a glass transition temperature less than or equal to 100° C.

26. A curable composition, comprising:
a (meth)acrylate-capped poly(2,6-dimethyl-1,4-phenylene ether);
an acryloyl monomer comprising at least two acryloyl moieties; and
a nanofiller selected from the group consisting of montmorillonite, nontronite, beidellite, volkonskoite, hectorite, saponite, sauconite, magadiite, and kenyaite;
wherein the nanofiller has no linear dimension greater than 100 nanometers; and
wherein the nanofiller is intercalated with an intercalant selected from the group consisting of water-soluble polymers, amphoteric surface-active agents comprising an aliphatic amine cationic moiety and a sulfonate or phosphate anionic moiety, choline compounds, organosilane compounds, and mixtures thereof.

27. A curable composition, comprising:
about 1 to about 90 parts by weight of a (meth)acrylate-capped poly(2,6-dimethyl-1,4-phenylene ether);
about 10 to about 99 parts by weight of an acryloyl monomer comprising at least two acryloyl moieties; and
about 0.5 to about 80 weight percent of a nanofiller selected from the group consisting of montmorillonite, nontronite, beidellite, volkonskoite, hectorite, saponite, sauconite, magadiite, and kenyaite;
wherein the nanofiller has no linear dimension greater than 100 nanometers; and
wherein the nanofiller is intercalated with an intercalant selected from the group consisting of water-soluble polymers, amphoteric surface-active agents comprising an aliphatic amine cationic moiety and a sulfonate or phosphate anionic moiety, choline compounds, organosilane compounds, and mixtures thereof;
wherein the amounts of the (meth)acrylate-capped poly (2,6-dimethyl-1,4-phenylene ether) and the acryloyl monomer are based on 100 parts by weight total of these components, and the amount of the nanofiller is based on the total weight of the composition.

28. A cured composition formed by curing the composition of claim 1.

29. A method of making a curable composition comprising
combining a nanofiller with a polymer to form a masterbatch; and
mixing the masterbatch with a functionalized poly (arylene ether) and an olefinically unsaturated monomer;
wherein the nanofiller is selected from the group consisting of montmorillonite, nontronite, beidellite, volkonskoite, hectorite, saponite, sauconite, magadiite, and kenyaite;
wherein the nanofiller has no linear dimension greater than 100 nanometers; and
wherein the nanofiller is intercalated with an intercalant selected from the group consisting of water-soluble polymers, amphoteric surface-active agents comprising an aliphatic amine cationic moiety and a sulfonate or phosphate anionic moiety, choline compounds, organosilane compounds, and mixtures thereof.

30. A method of making a curable composition comprising
combining a nanofiller with a solvent and an intercalant to form a dispersion; wherein the intercalant is selected from the group consisting of water-soluble polymers, amphoteric surface-active agents comprising an aliphatic amine cationic moiety and a sulfonate or phosphate anionic moiety, choline compounds, organosilane compounds, and mixtures thereof; and
mixing the dispersion with a functionalized poly(arylene ether) and an olefinically unsaturated monomer;

wherein the nanofiller is selected from the group consisting of montmorillonite, nontronite, beidellite, volkonskoite, hectorite, saponite, sauconite, magadiite, and kenyaite; and wherein the nano filler has no linear dimension greater than 100 nanometers.

31. The method of claim 30 wherein the mixing has a mixing energy of less than 50 kilojoules per liter, based on the volume at 25° C. of the composition being mixed.

32. The composition of claim 2, wherein Q is the residuum of a dihydric phenol.

* * * * *